United States Patent
Mackin et al.

(10) Patent No.: US 11,240,860 B2
(45) Date of Patent: Feb. 1, 2022

(54) RUN-TIME SYSTEM FOR DEPLOYMENT OF INDOOR POSITIONING SYSTEMS

(71) Applicant: INTERNATIONAL BUSINESS MACHINES CORPORATION, Armonk, NY (US)

(72) Inventors: Casey David Mackin, Milpitas, CA (US); Divyesh Jadav, San Jose, CA (US); German H. Flores, San Jose, CA (US); Thomas Griffin, Campbell, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 142 days.

(21) Appl. No.: 16/699,596

(22) Filed: Nov. 30, 2019

(65) Prior Publication Data

US 2021/0168886 A1 Jun. 3, 2021

(51) Int. Cl.
*H04B 17/20* (2015.01)
*H04W 76/15* (2018.01)
*H04B 17/318* (2015.01)
*H04W 4/029* (2018.01)
*H04W 4/80* (2018.01)

(52) U.S. Cl.
CPC .......... *H04W 76/15* (2018.02); *H04B 17/318* (2015.01); *H04W 4/029* (2018.02); *H04W 4/80* (2018.02)

(58) Field of Classification Search
CPC ...... H04B 17/318; G01S 5/0252; H04W 4/02; H04W 4/025; H04W 4/029; H04W 4/33; H04W 4/80; H04W 76/15
See application file for complete search history.

(56) References Cited

U.S. PATENT DOCUMENTS

| | | | |
|---|---|---|---|
| 8,405,656 B2 | 3/2013 | El Dokor et al. | |
| 9,110,159 B2 * | 8/2015 | Vartanian | G01S 15/89 |
| 9,167,386 B2 * | 10/2015 | Valaee | H04W 4/025 |
| 9,791,540 B2 * | 10/2017 | Want | G01S 1/042 |
| 10,306,419 B2 * | 5/2019 | Abou-Rizk | G01S 5/06 |

(Continued)

FOREIGN PATENT DOCUMENTS

| | | |
|---|---|---|
| EP | 2695459 B1 | 4/2016 |
| WO | 2015/186043 A1 | 12/2015 |
| WO | 2017/105621 A1 | 6/2017 |

OTHER PUBLICATIONS

Kolakowski, A Hybrid BLE/UWB Localization Technique with Automatic Radio Map Creation, IEEE, 4 pages, Jun. 20, 2019.*

(Continued)

*Primary Examiner* — Frank Duong
(74) *Attorney, Agent, or Firm* — Intelletek Law Group, PLLC; Gabriel Daniel, Esq.

(57) ABSTRACT

During a setup phase, a computing device determines a map of an area including one or more regions. Signals are received from a plurality of ultra-wideband (UWB) nodes and a plurality of Bluetooth Low energy (BLE) nodes in the area, relayed through one or more agents at one or more positions of the area. A precision map is created based on a correlation between the received signals from the UWB nodes and the received signals from the BLE nodes. Locations to place the plurality of BLE nodes are identified based on the precision map.

22 Claims, 10 Drawing Sheets

(56) References Cited

U.S. PATENT DOCUMENTS

| | | | |
|---|---|---|---|
| 10,470,155 B2* | 11/2019 | Abou-Rizk | H04W 4/025 |
| 2012/0072106 A1* | 3/2012 | Han | G01C 21/206 |
| | | | 701/410 |
| 2015/0351007 A1* | 12/2015 | Bell | H04W 4/022 |
| | | | 370/315 |
| 2016/0212579 A1 | 7/2016 | Duan et al. | |
| 2016/0218940 A1 | 7/2016 | Eranko | |
| 2017/0236351 A1 | 8/2017 | Menard et al. | |

OTHER PUBLICATIONS

Kolakowski, Kalman filter based localization in hybrid BLE-UWB positioning system, IEEE, 4 pages, Sep. 2017.*

Mackin, Exploration for Range Based Indoor Localization Technologies and Algorithms, University of California at Berkeley, 37 pages, Aug. 9, 2018.*

Paterna et al., A Bluetooth Low Energy Indoor Positioning System with Channel Diversity, Weighted Trilateration and Kalman Filtering, SENSORS, 32 pages, Dec. 2017.*

Flores et al., An iBeacon Training App for Indoor Fingerprinting, IEEE, 4 pages, 2017.*

Search Report and Written Opinion from related international application No. PCT/IB2020/060811 dated Feb. 25, 2021, 10 pgs.

Domingo-Perez, F. et al., "Optimization of the Coverage and Accuracy of an Indoor Positioning System with a Variable Number of Sensors"; Sensors (2016); vol. 16:934; 18 pgs.

Isler, V., "Placement and Distributed Deployment of Sensor Teams for Triangulation Based Localization." Proceedings 2006 IEEE International Conference on Robotics and Automation, 2006. ICRA 2006 . . . IEEE, 2006, 6 pgs.

Martínez, S. et al., "Optimal Sensor Placement and Motion Coordination for Target Tracking"; Automatica (2006); vol. 42; pp. 661-668.

Parker, L. et al., "Multiple Mobile Robot Systems"; Springer Handbook of Robotics (2008); Ch. 40, pp. 921-941.

\* cited by examiner

RUN-TIME SYSTEM FOR DEPLOYMENT OF INDOOR POSITIONING SYSTEMS

BACKGROUND

Technical Field

The present disclosure generally relates to positioning systems, and more particularly to methods and systems of deploying indoor positioning systems.

Description of the Related Art

There has been an ever-increasing use of various technologies that position a device in space. Many applications utilize a user's location information to connect them with other users, venues, events, or resources nearby or to give them directions on how to reach them. This location information is also used to collect usage information. Many of these solutions are based on the Global Positioning System (GPS) and are therefore limited in accuracy and to line-of-sight operation.

SUMMARY

According to various exemplary embodiments, a computing device, a non-transitory computer readable storage medium, and a method of deploying an indoor positioning system are provided. During a setup phase, a map of an area including one or more regions is determined. Signals are received from a plurality of ultra-wideband (UWB) nodes and a plurality of Bluetooth Low energy (BLE) nodes in the area, which are relayed through one or more agents at one or more positions of the area.

A precision map is created based on a correlation between the received signals from the UWB nodes and the received signals from the BLE nodes. Locations to place the plurality of BLE nodes are identified based on the precision map.

In one embodiment, upon completing the setup phase, the UWB nodes are removed upon the plurality of BLE nodes being placed based on the precision map.

In one embodiment, the acts of the setup phase are repeated until each of the one or more nodes is placed in a location that meets one or more predetermined criteria.

In one embodiment, the act of determining the map of the area includes receiving the map from a computing device of an administrator.

In one embodiment, constraints of the area are received from a computing device of an administrator. The constraints may include, for each region of the area, at least one of: walls, equipment, one or more locations to avoid a BLE sensor placement, or a BLE sensor precision threshold. The one or more regions may not have the same constraints.

In one embodiment, receiving signals from the UWB nodes and the plurality of BLE nodes in the area include moving at least one of the one or more agents in the area to each of the one or more positions of the area.

In one embodiment, for each BLE node a visibility map is created based on the received signals from the plurality of BLE nodes in the area. The identification of the locations to place the plurality of BLE nodes is further based on the visibility map. Each BLE node having a visibility that is below a predetermined threshold can be identified for removal.

In one embodiment, creating the precision map includes, for each of the one or more positions in the area, a first estimate of a location of the position of the corresponding agent, calculated based on the received signals from the plurality of UWB nodes in the area. A second estimate of the location of the position of the corresponding agent is calculated based on the received signals from at least some of the plurality of BLE nodes in the area. The first estimate is used as a ground truth reference for the second estimate. A difference between the first estimate and the second estimate is determined and recorded in the precision map.

In one embodiment, the first and second estimates of the location are by way of trilateration of the received UWB and BLE signals, respectively.

In one embodiment, a precision captured in the precision map is based on at least one of: a variance between the first estimate and the second estimate at a predetermined time, or a variance between the first estimate and the second estimate over a time period.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Overview

Figure 1:
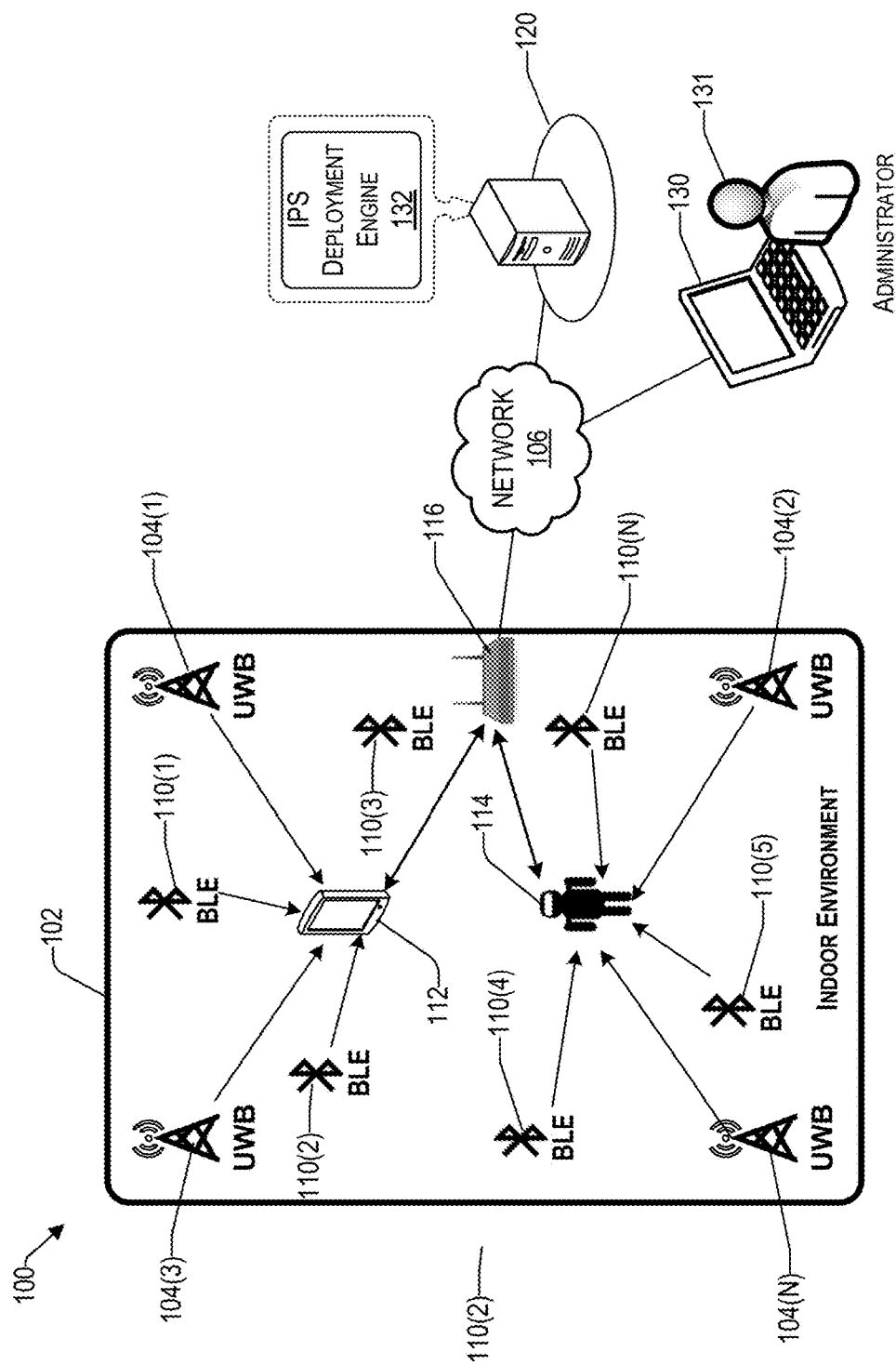
FIG. 1 illustrates an example architecture of a run-time deployment of an indoor positioning system, consistent with an illustrative embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to methods and system of optimizing the deployment of positioning system technology. Today's applications are rapidly expanding into indoor applications and other applications where GPS alone may not provide adequate performance. A few examples include guiding workers in an office building, tracking equipment and caregivers in a hospital, guiding shoppers in a shopping mall, and even guiding robots and drones in caves, tunnels, and factories. For such obstructed environments, positioning systems should be intelligently deployed within the environment and operated with a higher level of accuracy and precision.

A challenge in designing an effective indoor positioning system (IPS) includes configuring a system (e.g., node placement, transmission power, transmission rate, and other settings) in a way that maximizes system performance across the map. As used herein, a map includes a set of states (positions) that an agent can occupy. A node relates to a sensor or transmitter operating at a known location within the map. A configuration relates to a set of nodes (and their corresponding settings) at known locations inside a map.

In various scenarios, indoor environments may have complex constraints for node placements including, without limitation: building access restrictions, building infrastructure restrictions, availability of power sources, safety restrictions, etc. Solving the challenge of placing nodes in an indoor environment as a pure optimization problem is difficult due to the complexity and, frequently, lack of knowledge of the constraints. Solving this optimization problem in absence of constraints or with unrealistic constraints may lead to unrealizable solutions in practice.

One example of a challenging indoor environment is that of the inside of a hospital. Patient privacy and safety restrictions may remove several otherwise valid locations from the map. In addition, other equipment may obstruct node placement, interfere with signal propagation, or not provide a convenient power source. For example, certain rooms may have specialized equipment (e.g., X-ray, MRI, etc.) that restrict node placement from vast regions of the map. These restrictions are often not realized until the nodes are deployed.

Other example environments where the technology discussed herein is applicable include subways, shopping centers, skyscrapers, etc. Salient environments are not limited to buildings but may include, without limitation, tunnels, caves, ruins, etc., each, including their own unique constraints. All such environments are supported by the indoor positioning system discussed herein.

In addition to configuring an efficient IPS, another consideration is that of system maintenance and adaptation to environmental changes. Indoor environments are dynamic in that they can be readily reconfigured. For example, hospitals move equipment and furniture and often undergo construction to extend buildings or upgrade the infrastructure. Broken, occluded, or missing nodes may often be replaced at predetermined intervals or upon trigger events, which may require adding additional nodes (e.g., new regions in an area and/or to recently obstructed areas).

Accordingly, what is discussed herein is a visually intuitive interactive tool that provides node placement analytics and guidance that can be used to provide an improved indoor positioning system configuration. In one aspect, various technologies with different levels of accuracy and precision are used in harmony during a setup phase to provide a high accuracy, dependable, and cost-effective indoor positioning system for an active phase. For example, high performance technology is used during a setup phase to optimize deployment, which may be removed for a later active phase that uses more economical technology, to reduce positioning system complexity and cost.

In one embodiment, a high precision ultra-wideband (UWB) technology is paired with a low precision Bluetooth Low Energy (BLE) technology to provide an effective placement of nodes within a map that yield a predetermined accuracy. A received signal strength (RSS) of each node is used as a metric for estimating the distance from a BLE node to a receiver (e.g., the subject being monitored or guided). However, in various embodiments, the technologies and metrics discussed herein are interchangeable and can be extended to more than two technologies.

For example, UWB nodes may be used during a setup phase to optimize the performance of the BLE nodes. These UWB nodes can thereafter be disabled (and/or reused in other environments). Although BLE may be less precise than UWB, it provides considerably reduced power consumption and cost, thereby being able to use more devices (e.g., nodes). In some scenarios, fewer BLE nodes may be used while maintaining a desired accuracy. Consider for example the use of a UWB system at a plurality of locations (e.g., at four corners of an auditorium), which are used to optimize the placement of BLE nodes. After optimization is complete, the UWB system can be moved to a second location (e.g., a cafeteria to start the same process again). Hence, allowing a minimal UWB system to be repeatedly used to deploy BLE nodes over a large space. In this way, a quick and easy to use indoor positioning system deployment guidance at run-time is provided that maximizes performance, minimizes equipment and energy cost, and is able to adhere to various constraints, discussed in more detail later.

An administrator is able to quickly determine a valid and efficient configuration by making on the fly informed decisions about where to place BLE nodes. In one embodiment, the system itself provides a suggested number and locations for the BLE nodes. In addition, administrators are able to periodically test the indoor positioning system for updates with minimal effort as the environment changes and maintenance is needed, which can be performed with the UWB nodes or without. Unlike prior art systems that use Wi-Fi and BLE solutions based on RSS, the precision and accuracy in determining a location of an agent is improved while the cost of deployment is kept low. By placing BLE nodes at appropriate locations and removing BLE nodes that are not effective, the positioning system performance is improved while energy and equipment cost is reduced. Still further, the techniques discussed herein need not involve complex and/or computationally intensive algorithms (e.g., particle filter, deep learning, genetic algorithms, etc.), which are sometimes used to overcome for poor node placement and poor sensor accuracy/precision.

The techniques described herein may be implemented in a number of ways. Example implementations are provided below with reference to the following figures.

Example Architecture

FIG. 1 illustrates an example architecture 100 of a run-time deployment of an indoor positioning system (IPS), consistent with an illustrative embodiment. Architecture 100 includes an area 102 where a global positioning systems (GPS) or other satellite technologies may lack sufficient precision or penetration, such as, without limitation: a building, parking garage, stadium, shopping mall, airport, hospital, tunnel, cave, factory, etc. There are two main technologies used for locating an agent within the area, namely UWB and BLE, represented by nodes 104(1) to 104(N) and 110(1) to 110(N), respectively. These technologies play different roles during a setup phase and an active phase, as discussed in more detail below. As used herein, an agent is a receiver that is able to harvest UWB and/or BLE signals. In various embodiments, agents may take the form of portable handsets, smart-phones, tablet computers, personal digital assistants (PDAs), and smart watches, although they may be implemented in other form factors, including consumer, medical, and business electronic devices, robots, and drones. For discussion purposes, the agents are represented by a mobile device 112 and a robot 114. For example, a robot, drone, etc., 114 may automatically roam the area 102 during a setup phase to help determine the appropriate location of the BLE nodes 110(1) to 110(N) by way of support from the UWB nodes 104(1) to 104(N), discussed in more detail later. Then, during an active phase, these BLE nodes 110(1) to 110(N) act as beacons to guide agents, such as a user having a mobile device 112, through the area 102.

There may a network 106 that allows the agents 112 and 114 to communicate with various resources connected to the network 106, such as the indoor positioning system (IPS) deployment engine 132 running on a server 120 and/or an administrator via a corresponding computing device 130. In some embodiments, the network 106 may be accessed via a router 116. The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet, that provides various ancillary services, such as communication with the IPS deployment engine 132 to identify the proper placement and the number of the BLE nodes 110(1) to 110(N).

In some embodiments, an administrator 131 may provide as input various constraints or limitations of the area 102 via their computing device 130. For example, these constraints may include walls, equipment that cannot be readily moved, areas to avoid to place sensors (e.g., to prevent interference with medical equipment), etc.

In some embodiments, the administrator 131 may provide an initial placement of the BLE nodes 110(1) to 110(N) as well as select their final placement after receiving feedback (e.g., in the form of precision, visibility, and/or blackout maps, as well as other metrics, discussed in more detail later) from the IPS deployment engine 132 during the setup phase.

Figure 2:
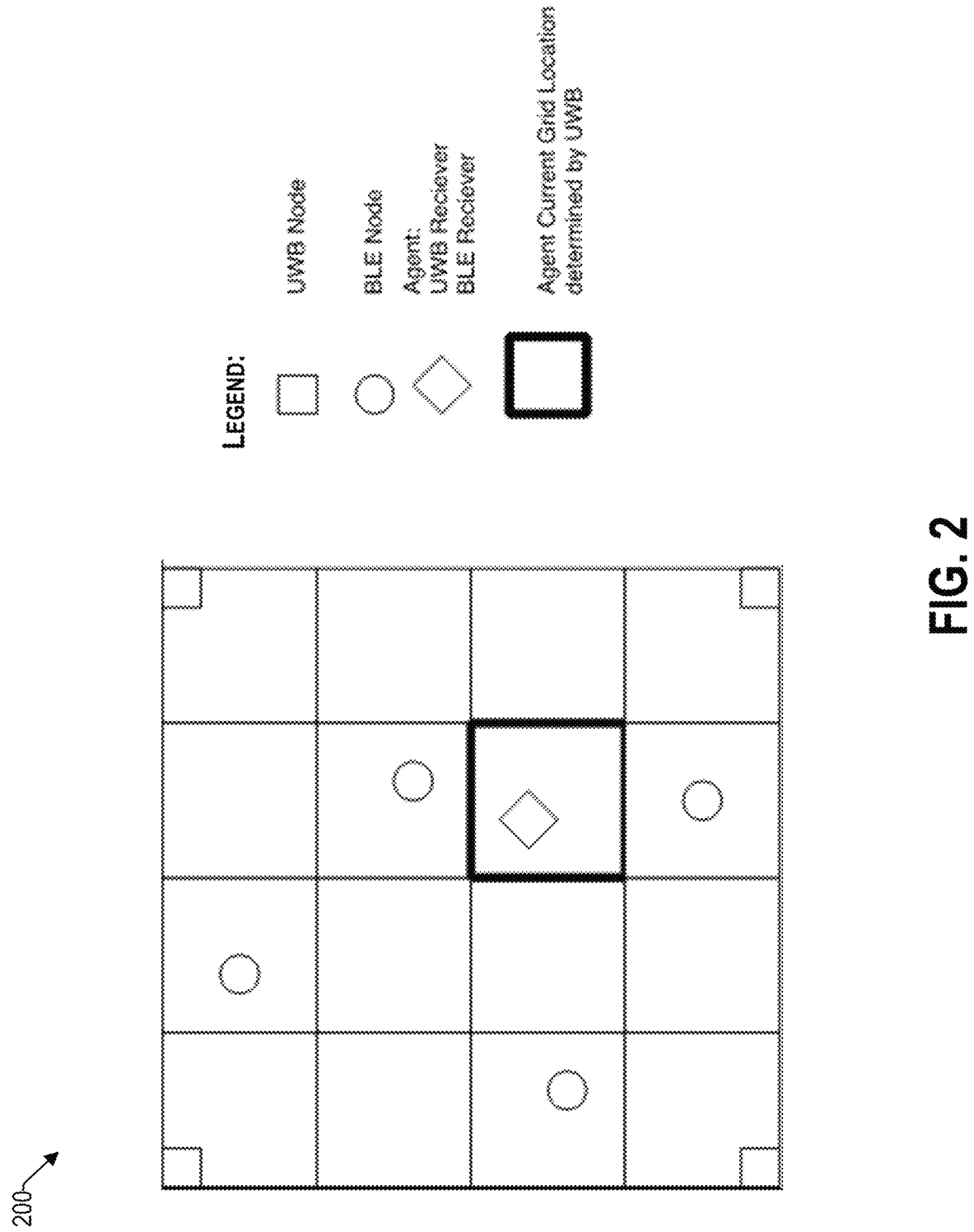
FIG. 2 illustrates an example grid map with a deployment of ultra-wideband and Bluetooth low energy nodes, consistent with an illustrative embodiment.

The initial input may include where to place the UWB nodes as well as the BLE node deployment information, such as a universally unique identifier (UUID) of each node (e.g., BLE) and the coordinates of each node within the map 200. The nodes can initially be placed randomly or intuitively by the administrator. For example, the UWB nodes may be placed at the four corners of the map 200, as illustrated in FIG. 2. The initial input may further include the desired accuracy for each grid location (e.g., within a quadrant, sometimes referred to herein as a region) in the map 200. For example, different quadrants may have different level of precision: e.g., kitchen, storage locations, or bathrooms may not require the same level of precision as hallways and conference rooms. Further, block sizes may be specified, namely the granularity of the grid for building the subsequent maps (e.g., 1 m, 2 m, 5 m, etc.) as well as the desired accuracy for each region. The administrator may provide an initial number of BLE nodes to be used, as well as a lower and an upper limit.

In some embodiments, the administrator 131 specifies, for the setup phase, the duration (e.g., 2 hours, 1 day, etc.), the resolution of measurements (e.g., at what intervals a location determination is performed (e.g., 0.5 m, 1 m, etc.)), the type of agent (e.g., a robot, a drone, an individual walking through the area 102 with a UWB and BLE receiver, whether information is to be harvested by various agents over a predetermined period, etc.), and locations to avoid (e.g., agents are not expected to cover that area during a later, active phase). In some embodiments, the administrator 131 may provide as input the precision function and the visibility function to use by the IPS deployment engine (discussed in more detail later).

For example, during a setup phase, the UWB nodes 104(1) to 104(N) are used to determine a receiver's (e.g., agent 114) current block location within a grid map. In this regard, reference is made to FIG. 2, which illustrates an example grid map 200 with a deployment of UWB and BLE nodes, consistent with an illustrative embodiment. The UWB nodes are depicted as squares, BLE nodes as circles, and the agent as a diamond. The UWB nodes can achieve a high level of accuracy (e.g., within 10 cm) and can therefore be used as the reference or ground truth of the location of an agent. The received signal strength RSS of Bluetooth low energy (BLE) nodes (i.e., at known positions) obtained by the mobile agent can be used to gather measurements for construction of a precision maps, visibility maps, and blackout maps, as well as to compute several other performance metrics, discussed later. The RSS, sometimes referred as the received signal strength indicator (RSSI), is a measurement, expressed in decibels (dB), of the power present in a received radio signal from the BLE nodes, which operate as beacons having known locations.

Upon comparing the received signal values from the registered BLE nodes and their known coordinates, the agent is able to estimate its distance (e.g., using a path loss model) to each corresponding BLE node through the RSSI. It will be understood that other models may be used as well. The longer the distance is, the lower the RSSI signal. In one embodiment, trilateration is used with three or more BLE nodes that are in a line of sight of the agent to determine its position on the map 200. Typically, three or more nodes are used for determining a position of an agent within the map 200. However, in some scenarios, such as narrow passage ways (e.g., tunnels or hallways), two beacons (i.e., BLE nodes) may suffice. When the BLE nodes are effectively placed, the location of the agent can be determined within a desired accuracy. To achieve the desired accuracy, the UWB nodes are used to determine the correct number and placement of the BLE nodes. To that end, precision, visibility, and/or blackout maps are generated by correlating the signals received from the UWB nodes and BLE nodes. These maps facilitate the determination of the number of BLE nodes as well as their correct placement to achieve a desired precision for each region of the map 200, after which the UWB nodes can be removed (e.g., to be repurposed for another area). In this way, a low energy, low complexity, low cost, and high accuracy IPS can be deployed.

Referring back to FIG. 1, while the IPS deployment engine 132 is illustrated by way of example to be part of a remote server 120, in one embodiment, the functions of the IPS deployment engine 132 can be performed by the agent (e.g., 112 or 114) itself. In other embodiments, one or more of these computing platforms may be implemented by virtual computing devices in the form of virtual machines or software containers that are hosted in the cloud, thereby providing an elastic architecture for processing and storage.

Example User Device

Figure 3:
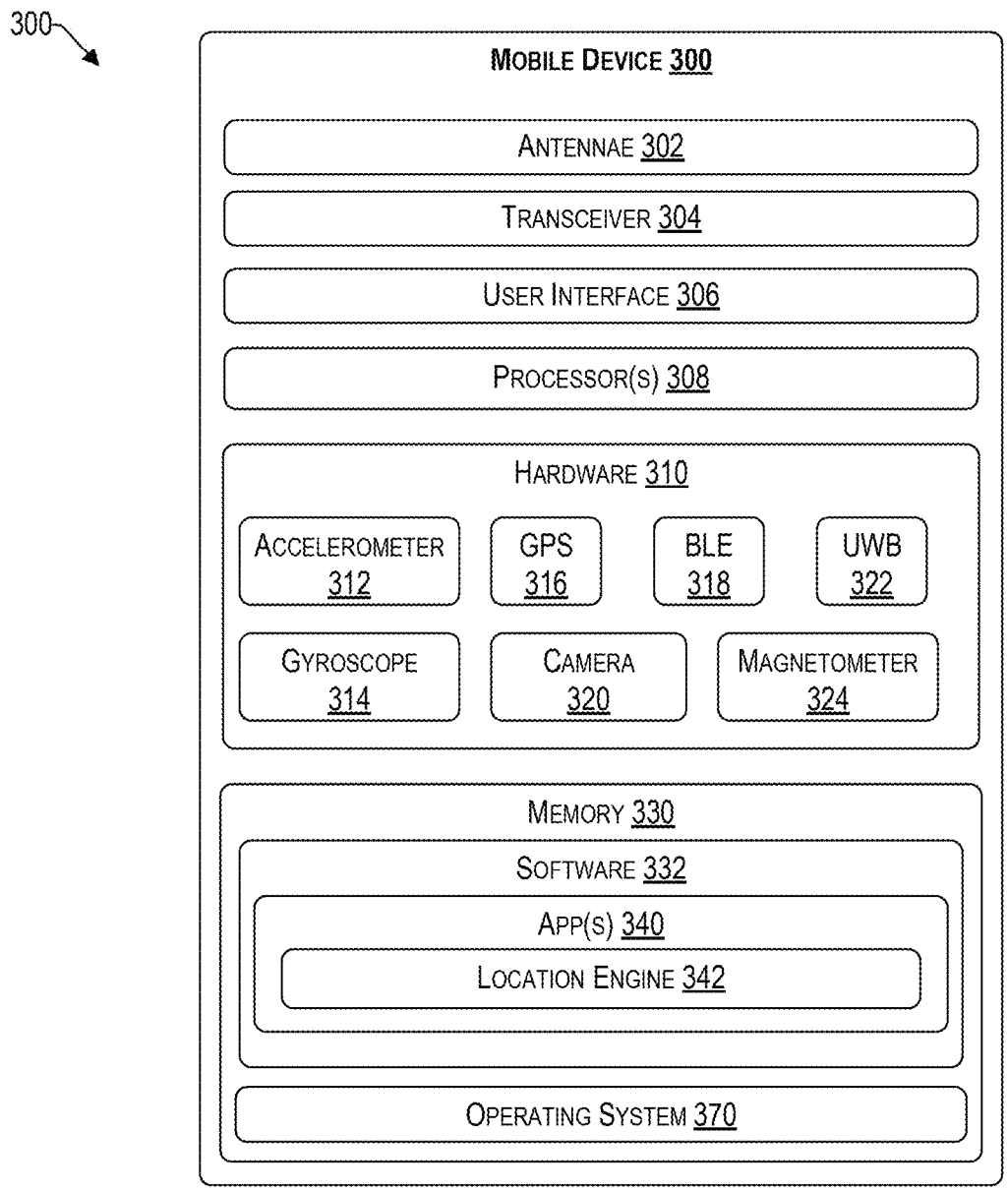
FIG. 3 is a block diagram showing various components of an illustrative agent in the form of mobile device at a high level.

As discussed in the context of FIG. 1, the efficient deployment of an IPS may involve different types of agents. To that end, FIG. 3 illustrates a block diagram showing various components of an illustrative agent in the form of mobile device 300 at a high level. For discussion purposes, the illustration shows the mobile device 300 in the form of a wireless computing device, while it will be understood that other computing devices are contemplated as well.

The mobile device 300 may include one or more antennae 302; a transceiver 304 for cellular, Wi-Fi communication, short-range communication technology, and/or wired communication; a user interface 306; one or more processors 308; hardware 310; and memory 330. In some embodiments, the antennae 302 may include an uplink antenna that sends radio signals to a base station, and a downlink antenna that receives radio signals from the base station. In some other embodiments, a single antenna may both send and receive radio signals. The same or other antennas may be used for Wi-Fi communication, UWB communication, and/or BLE communication. These signals may be processed by the transceiver 304, sometimes collectively referred to as a network interface, which is configured to receive and transmit digital data. In one embodiment, the mobile device 300 does not include an antenna 302 and communication with external components is via wired communication.

In one embodiment, the mobile device 300 includes one or more user interface(s) 306 that enables a user to provide input and receive output from the mobile device 300. For example, the user interface 306 may include a data output device (e.g., visual display(s), audio speakers, haptic device, etc.) that may be used to provide visual content to display various content, such as precision, visibility, and blackout maps, as well as various relevant metrics discussed herein. The display may also be used to display a location of the mobile device 300 with respect to an indoor area it is in.

The user interface(s) 306 may also include one or more data input devices. The data input devices may include, but are not limited to, combinations of one or more of keypads, knobs/controls, keyboards, touch screens, speech recognition packages, and any other suitable devices or other electronic/software selection interfaces.

The mobile device 300 may include one or more processors 308, which may be a single-core processor, a multi-core processor, a complex instruction set computing (CISC) processor, gaming processor, or any other type of suitable processor.

The hardware 310 may include a power source and digital signal processors (DSPs), which may include single-core or multiple-core processors. The hardware 310 may also include network processors that manage high-speed communication interfaces, including communication interfaces that interact with peripheral components. The network processors and the peripheral components may be linked by switching fabric. The hardware 310 may include hardware decoders and encoders, a network interface controller, and/or a USB controller.

The hardware 310 may include various sensors that may be used to facilitate the determination of the position and orientation of the mobile device 300. For example, there may be one or more accelerometers 312 that are configured to measure acceleration forces, which may be used to determine an orientation of the mobile device 300. There may be a gyroscope 314, which allows the measure of the rotation of the mobile device 300, as well as lateral movements. In one embodiment, the accelerometer(s) 312 and the gyroscope 414 may be used together to better determine the orientation and the speed of the movement of the mobile device 300.

The hardware 310 may further include a GPS sensor 316 that is operative to provide a location of the mobile device 300 and its speed when the mobile device 300 transitions out of an indoor area where satellite signals can be received. There may be a camera 320, as well as BLE 318 and/or UWB 322 sensors, and a magnetometer 324.

The mobile device 300 includes memory 330 that may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other magnetic storage devices, or any other non-transmission medium that can be used to store information for access by a computing device.

The memory 330 may store various software components or modules that are executable or accessible by the processor(s) 308 and controller(s) of the mobile device 300. The various components of the memory 330 may include software 332 and an operating system 370. The software 332 may include various applications 340, such as an IPS deployment engine 342 having several modules, each configured to control a different aspect of the IPS. In some embodiments, the location engine 342 may include the functionality of the features of the IPS deployment engine discussed herein. While the modules of the IPS deployment engine 342 are described above in the context of a software application, it is noted that one or more functions can be performed in hardware 310.

The operating system 370 may include components that enable the mobile device 300 to receive and transmit data via various interfaces (e.g., user controls, communication interface, and/or memory input/output devices), as well as process data using the processor(s) 308 to generate output. The operating system 370 may include a presentation component that presents the output (e.g., display at least part of the media content on an electronic display of the mobile device 300, store the data in memory 330, transmit the data to another electronic device, etc.) Additionally, the operating system 370 may include other components that perform various additional functions generally associated with an operating system 370. By virtue of the hardware and software of the mobile device 300, a location of the mobile device 300 can be identified with high accuracy and efficiency, while maintaining low IPS cost.

Example Block Diagram

Figure 4:
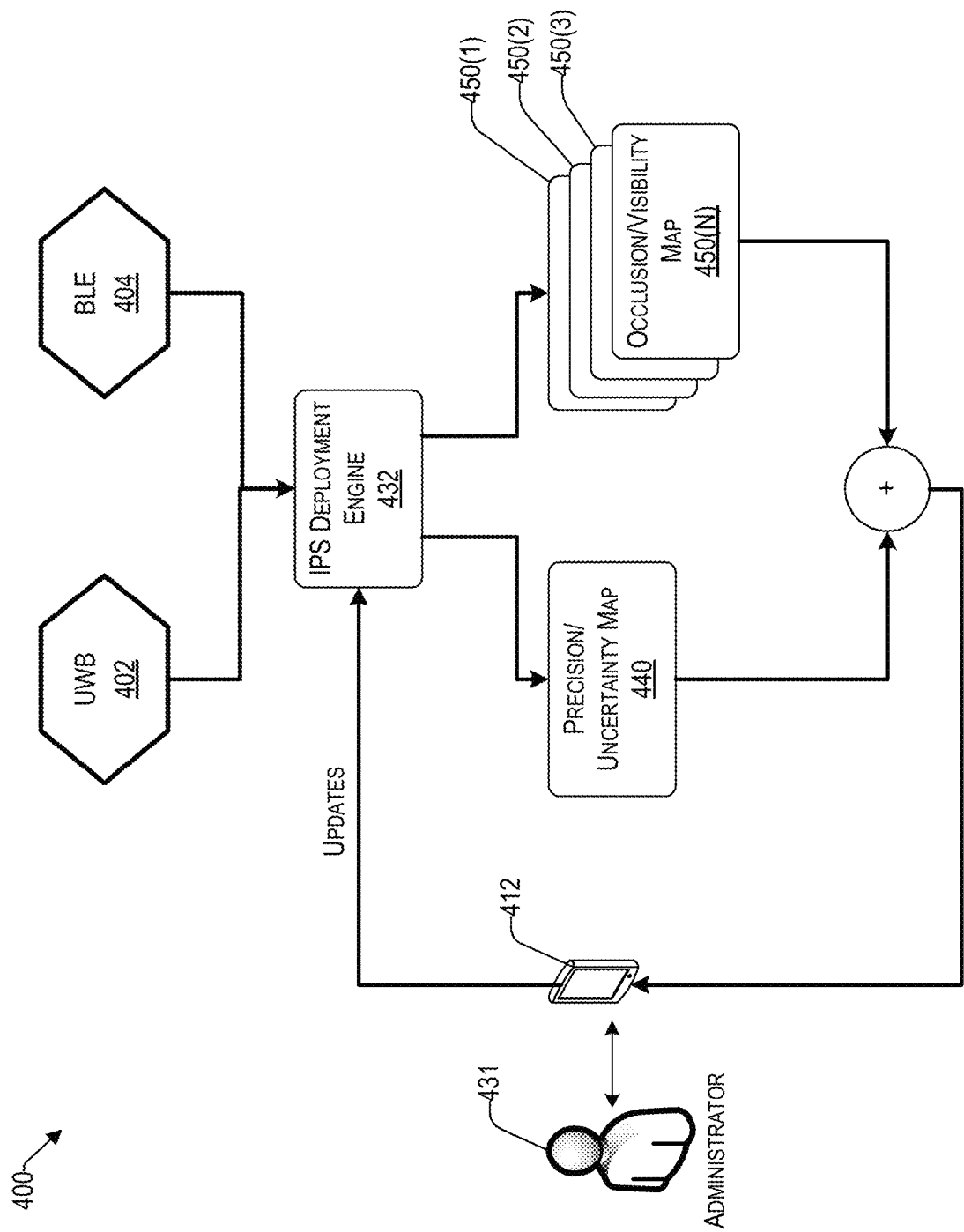
FIG. 4 illustrates a conceptual block diagram of generation an indoor positioning system deployment system, consistent with an illustrative embodiment.

FIG. 4 illustrates a conceptual block diagram 400 of an IPS deployment system, consistent with an illustrative embodiment. Several inputs are received by the IPS deployment engine 432 from a computing device 412 of an administrator 431 to initialize deployment. For example, the inputs may include, but are not limited to, a map of the environment, an UWB positioning system and locations thereof, a list of initial BLE node configuration information, and at least one receiver (e.g., agent) configuration. The map is gridded at an administrator 431 specified granularity (ideally corresponding to the level or precision desired for the application). The administrator 431 may also specify the sampling period over which harvested data will be stored.

During the setup phase, the IPS deployment engine 432, combines the signals received from an UWB positioning system (i.e., representing high precision and therefore the ground truth for the position of an agent) with a BLE positioning system (i.e., low precision, low cost, and low complexity). The BLE 404 RSS data from all active nodes is collected by the respective agents and stored by the IPS deployment engine 432 (e.g., posted to a RESTful service). The UWB positioning system 402 and a positioning algorithm (e.g., trilateration, extended Kalman filter (EKF), or any other appropriate real-time solution) are utilized to determine the current grid block locations of the one or more active data collection agents. UWB positioning data is also stored by the IPS deployment engine 432 (e.g., posted to the RESTful service). In one embodiment, the administrator 431 can interface with the IPS deployment engine 432 using a computing device running the location engine that has access to the RESTful service.

In one embodiment, the UWB nodes 402 are deployed with at least three or four nodes. For example, three nodes may be used for 2D positioning and four nodes may be used for 3D positioning. The UWB nodes 402 are deployed locally in a map region that is being optimized. BLE (i.e., low-precision) nodes 404 are deployed in the area according to an initial configuration (which can be random) to collect data. In one embodiment, the system is initialized underdeployed (e.g., below an initial minimum estimate) and BLE nodes 404 are added or moved to improve performance. The BLE node 404 measurements are collected and used by the IPS Deployment engine 432 to create maps representing overall precision of node measurements at each visited grid block, referred to herein as a precision map, which can be used to determine the low precision and/or high uncertainty regions in an area. In this regard, reference now is made to FIG. 5, which is a precision map 500 of an area created by an IPS development engine, consistent with an illustrative embodiment. For discussion purposes, the precision map 500 is described with reference to the IPS deployment system of FIG. 4.

In precision map 500, the BLE nodes are represented by "X" (e.g., 540). The precision map 500 may include obstructions (e.g., 520), such as concrete posts, non-movable equipment, etc. There may also be walls (e.g., 510) that provide a physical barrier for BLE nodes. For simplicity, the different types of obstructions, walls, and other limitations are collectively referred to herein as constraints.

In various embodiments, the restrictions can be received as inputs by the IPS deployment engine 432 from the administrator 431 via their computing device 412, or determined by the IPS deployment engine 432 based on signal strengths and noise from the BLE nodes or other sensors (e.g., optical, radar, laser, etc.). In some embodiments, restrictions may indicate to avoid placement of BLE nodes at locations within the area deemed inappropriate (e.g., equipment that may be affected, such as sensitive medical equipment, or equipment that interferes with the signals).

Figure 5:
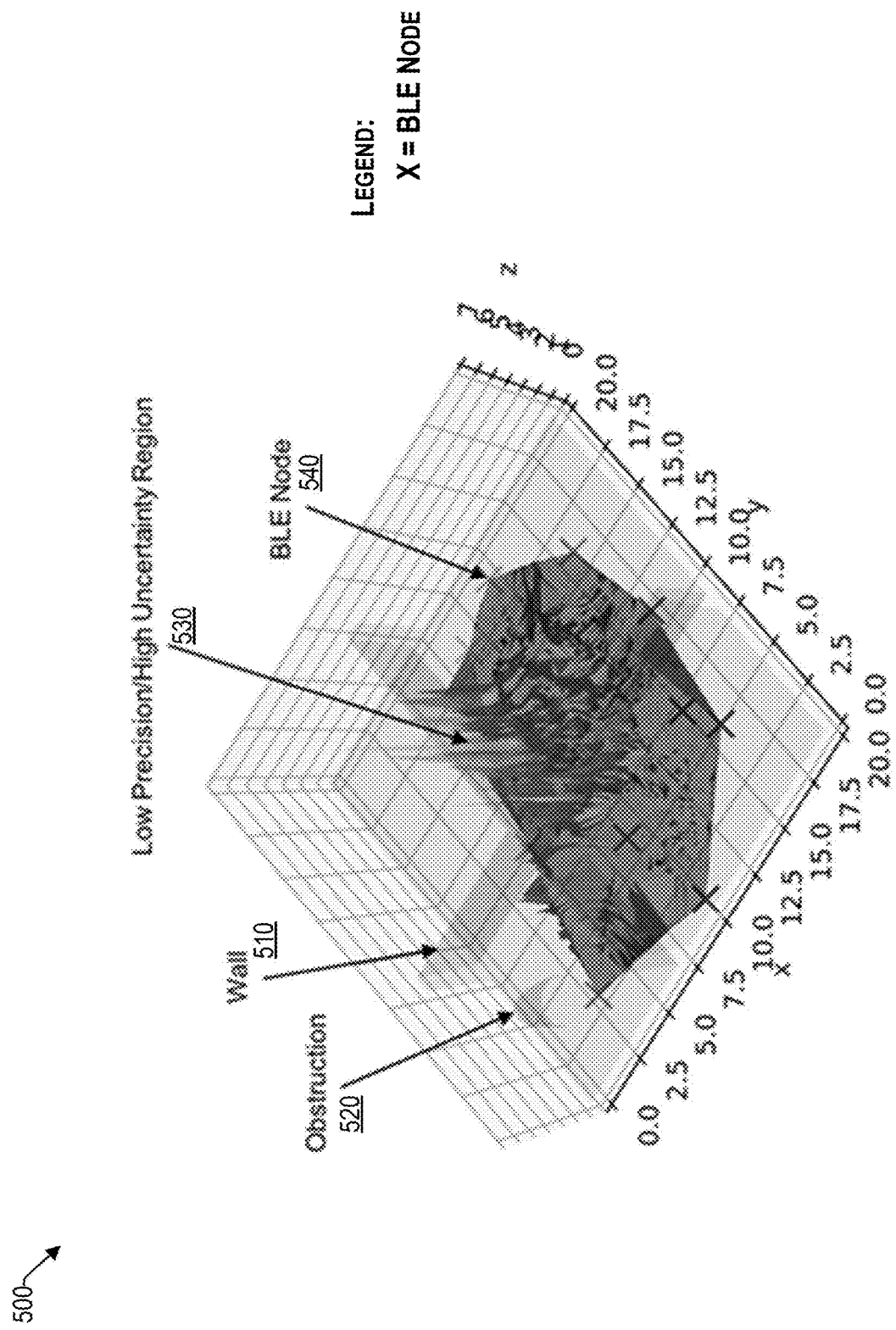
FIG. 5 is a precision map of an area created by an indoor positioning system development engine.

In the precision map 500 of FIG. 5, low regions represent high precision (i.e., low uncertainty), whereas high regions have low precision (i.e., high uncertainty). In one embodiment, the uncertainty can be determined by calculating a difference between position information provided by the UWB signals and BLE signals with respect to a subject receiver (i.e., agent). In this way, the IPS deployment engine 432 is able to determine where to place additional BLE nodes and where they are over or under represented for the level of precision desired. If the regions are substantially low in amplitude (e.g., below a predetermined threshold criterion provided by the administrator 431), then a BLE node may be removed. Stated differently, if the precision is unnecessarily high, it is indicative that there may be more BLE nodes than necessary, which may allow that BLE node to be repurposed to another location in the map grid 500.

In one embodiment, the precision indicated in FIG. 5 is based on variance between the ground truth (i.e., indicated by the location of a subject agent provided by the UWB nodes 402) and the BLE nodes 404, where the location based on the signals of the UWB nodes 402 represent the "ground truth." If the variance is above a predetermined threshold, then it is deemed a low precision and/or high uncertainty location and represented graphically as a spike (e.g., 530) in the precision map 500 and indicative that an additional beacon (i.e., BLE node) in that location would be warranted.

Different types of variance may be considered, where each time the location provided by UWB nodes is used as the ground truth. The first type of variance may be based on variation between the location provided by the UWB nodes and that by the BLE nodes. The second type of variation may be variation over time. For example, the same measurements may be taken at different times by the BLE nodes. If the signal from the BLE nodes varies over time above a predetermined threshold, then it is deemed as a high uncertainty and/or low precision region. Accordingly, the precision map 500 of FIG. 5 can be used to determine which regions should receive additional nodes, for localization algorithms to be effective. By way of non-limiting example, Kalman filter, Extended Kalman filter, k-nearest neighbors (KNN), trilateration, and triangulation can be used.

Figure 6:
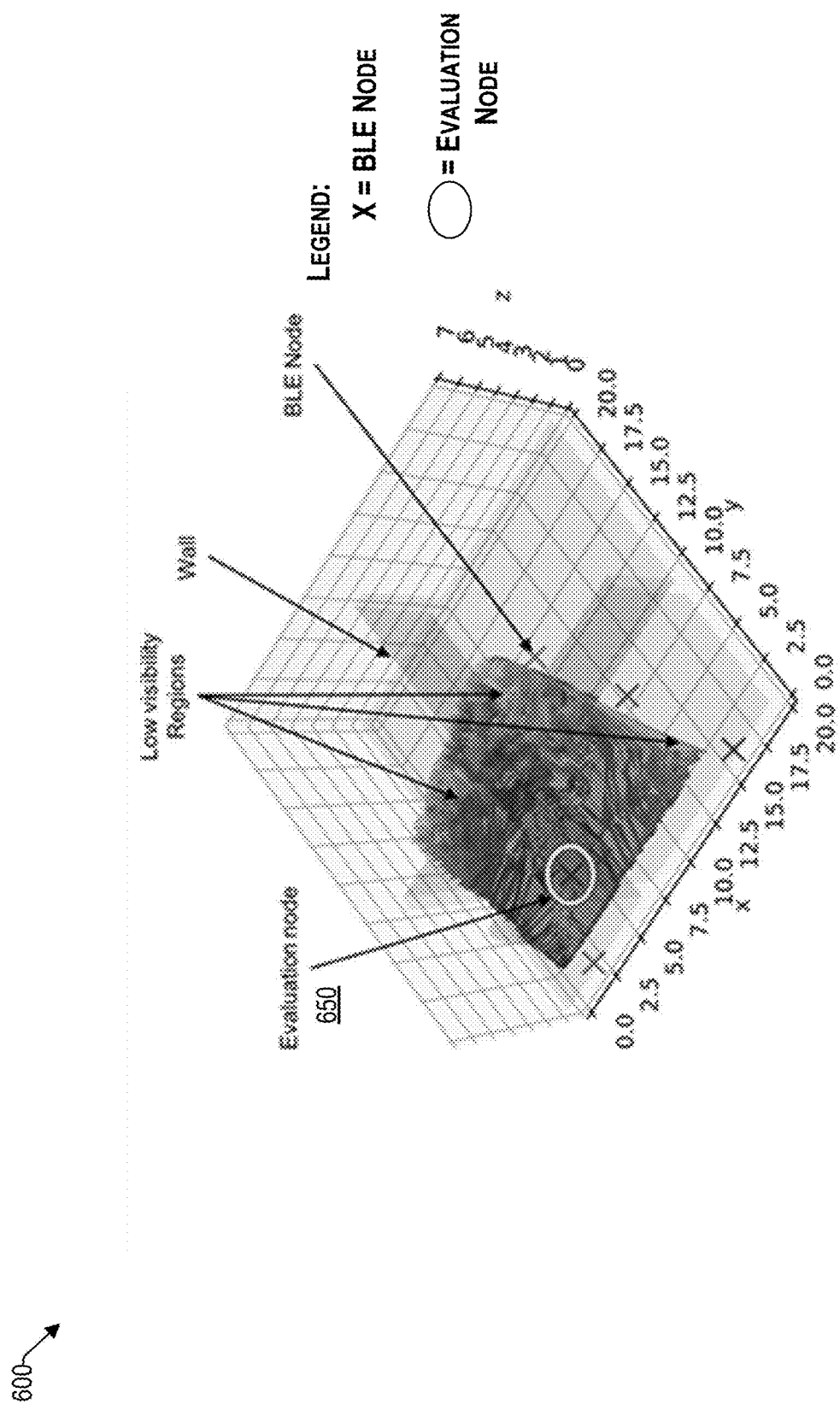
FIG. 6 illustrates a visibility map, consistent with an illustrative embodiment.

The visibility maps 450(1) to 450(N) display metrics of a particular node's visibility across the relevant area. In this regard, reference is made to FIG. 6, which illustrates a visibility map, consistent with an illustrative embodiment. The visibility map 600 is discussed with reference to the IPS deployment system of FIG. 4. As mentioned previously, the BLE nodes are represented by an "X." The low regions (e.g., light regions shown in FIG. 6) have high visibility (and therefore a low occlusion), whereas the high regions (e.g., darker regions shown in FIG. 6) have low visibility (and therefore high occlusion). The IPS deployment engine 432 can determine to remove nodes that have empty or nearly flat maps, as they do not contribute to the overall system performance. If a node's map goes blank or flat, it may also be indicative of a malfunctioning or missing BLE node, which in turn indicates that the node may need service.

Accordingly, the precision/uncertainty map 440 and the occlusion/visibility maps 450(1) to 450(N) collectively indicate how well a particular BLE node services different regions of an area and can provide insight into which nodes have poor placement and which regions are without coverage. These maps also indicate when nodes are malfunctioning or substantially obstructed as their visibility maps will go blank. In one embodiment, these precision/uncertainty maps 440 and occlusion/visibility maps 450(1) to 450(N) may be provided to an administrator 431 as guidance as to where to place the BLE nodes for effective positioning operation. In some embodiments, the maps are used to determine the appropriate number and placement of the BLE nodes. The appropriate locations can be indicated on the map, thereby disburdening the administrator 431 from interpreting the maps.

Accordingly, the precision/uncertainty map 440 displays generalized metrics of available measurements across positions in a map. In one embodiment, such display provides the administrator 431 an intuitive visualization of relative measurement precision, which can directly impact how well positioning algorithms perform.

The visibility maps 450(1) to 450(N) provide an intuitive visualization on a per node basis of how visible a node is across the map. In one embodiment, such visualization provides the administrator 431 an intuitive way of understanding whether a BLE node sufficiently contributes to the overall performance of the positioning system across the map (e.g., has a visibility that is above a predetermined threshold). An obstructed, malfunctioning, or disabled node is displayed as an empty spot on the visibility map.

By virtue of the different levels of automation, the interaction or workload for the administrator 431 may be made substantially more efficient or minimized in the determination of the number and appropriate placement of the BLE nodes 404. Passive or automated data collection agents can also be utilized (e.g., by way of robots and/or drones) to further reduce the workload for the administrator (e.g., workers in a building simply going through their normal day or several autonomous robots moving in the area over time using their mobile devices as BLE and UWB receivers during the setup phase). Upon completion of the setup phase, the UWB nodes can then be removed and repurposed to another area.

In one embodiment, the precision/uncertainty map 440 as well as the occlusion/visibility maps 450(1) to 450(N) are updated as measurements are collected, and can be utilized at any time by the IPS deployment engine 432 to perform updates to the BLE node 404 configuration. These maps can highlight to the administrator 431 the locations on the map that lack precise measurements from the available BLE nodes and which BLE nodes have low visibility within the map area. The administrator can place the nodes based on the intelligent guidance provided by the IPS deployment engine via these precision and visibility maps.

On the other hand, in regions where the precision and/or visibility are above given threshold levels, the administrator can remove nodes and potentially reposition them to locations having a low precision. This type of "administrator-in-the-loop" feedback and update features allow the administrator 431 to deploy a configuration at run-time without prior knowledge of the constraints of the area. In one embodiment, as the administrator 431 encounters constraints during deployment, they can be added to the map via a digital message from a computing device 412 to the IPS deployment engine 432. Accordingly, the IPS deployment engine 432 allows the administrator 431 to check and update the configuration of the area as the environment of an area changes over time.

The combination of these maps (i.e., precision/uncertainty 440 and occlusion/visibility (450(1) to 450(N)) along with administrator discretion in updating constraints and node placement, complete a loop for incremental improvement in node deployment. As more information about the environment is gathered, node placement can be further optimized based on the provided visuals and metrics of the IPS deployment engine 432.

The concepts discussed herein, can provide, among other benefits, run-time deployment guidance, performance improvement, equipment cost reduction, energy cost reduction, maintenance cost reduction, system failure notification, environmental change notification, etc.

Example Functions Used to Build Maps

Figure 7:
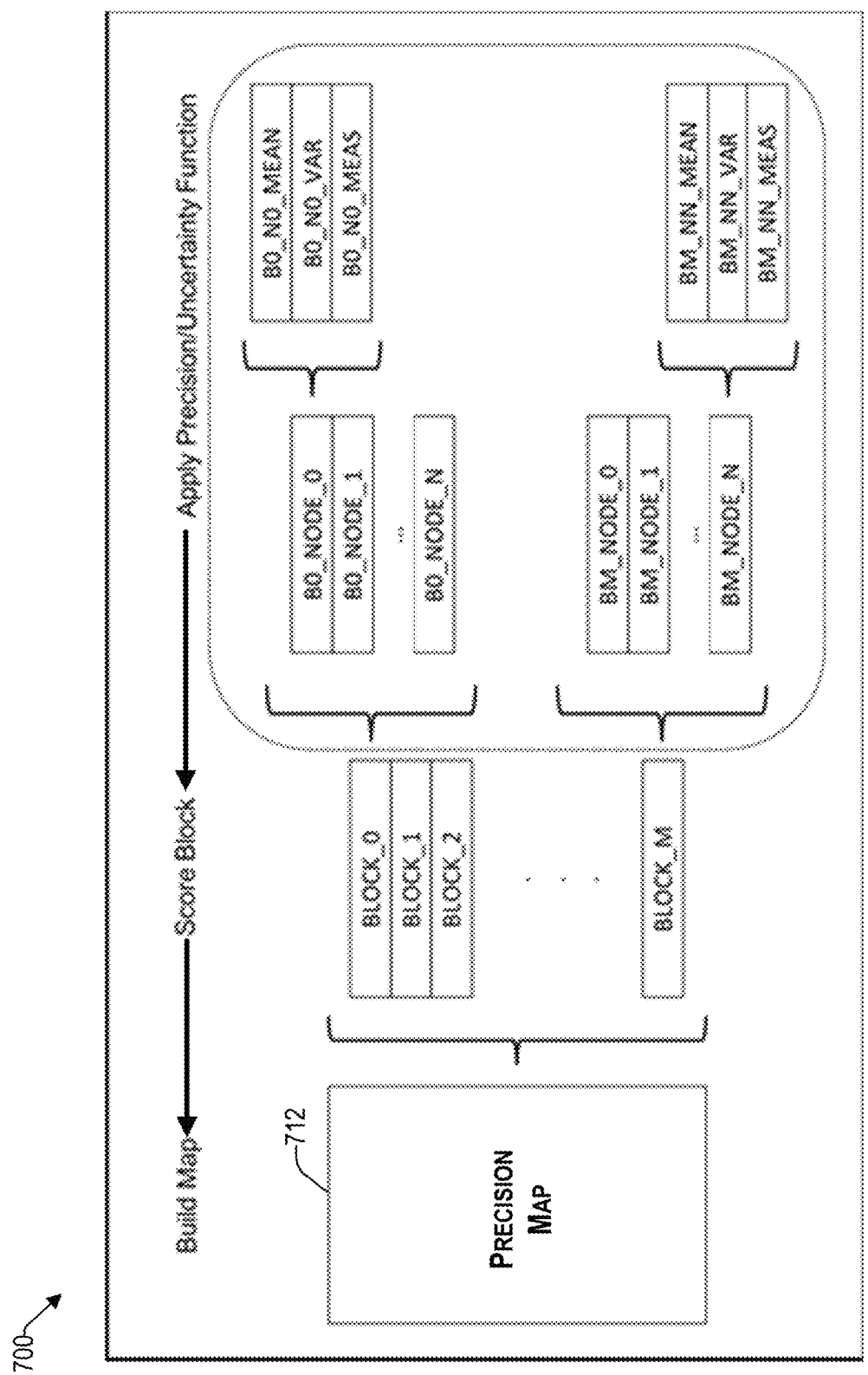
FIG. 7 is a block diagram of data structures used to generate a precision/uncertainty map for an area, consistent with an illustrative embodiment.

There are several candidate functions for creating the precision and visibility maps discussed herein. In some embodiments, the administrator 431 can choose to use their own metric in place of the predefined candidate functions. In this regard, reference is made to FIG. 7, which is a block diagram 700 of data structures used to generate a precision/uncertainty map 712 for an area, consistent with an illustrative embodiment.

The precision map 712 may cover an area comprising a plurality of blocks (e.g., Block_0 to Block_M). Each block may include a plurality of BLE nodes. It should be noted that the number of BLE nodes may be different or the same for each block. For each BLE node of a block, a precision/visibility function is applied by the IPS deployment engine to compute various statistics for that particular node of the block. The specified precision function may be applied to the statistics on a per block basis. The precision function returns a generalized measurement of the precision of available measurements within the grid block. These measurements are then added to the precision map 712.

Accordingly, as explained above, the precision map is used by the IPS deployment engine to facilitate the determination of the number of BLE nodes and the locations thereof. For example, for each grid block, all BLE node measurements are taken by the IPS deployment engine and used to compute the variance for each BLE node. Then the IPS deployment engine may compute the average variance of the n nodes having the minimum variance (we can refer to this metric as average minimum variance), and generate a map visualizing this metric across the grid map. Blocks with the worst scores are prioritized for additional node placement. For example, at a grid block, signals from BLE nodes far away could still be detected and they might not contribute at all since they are far away, and the signal variance is too high. So just looking at the nodes with minimum variance might be appropriate. Accordingly, in some embodiments, a lower and/or upper limit is used.

Figure 8:
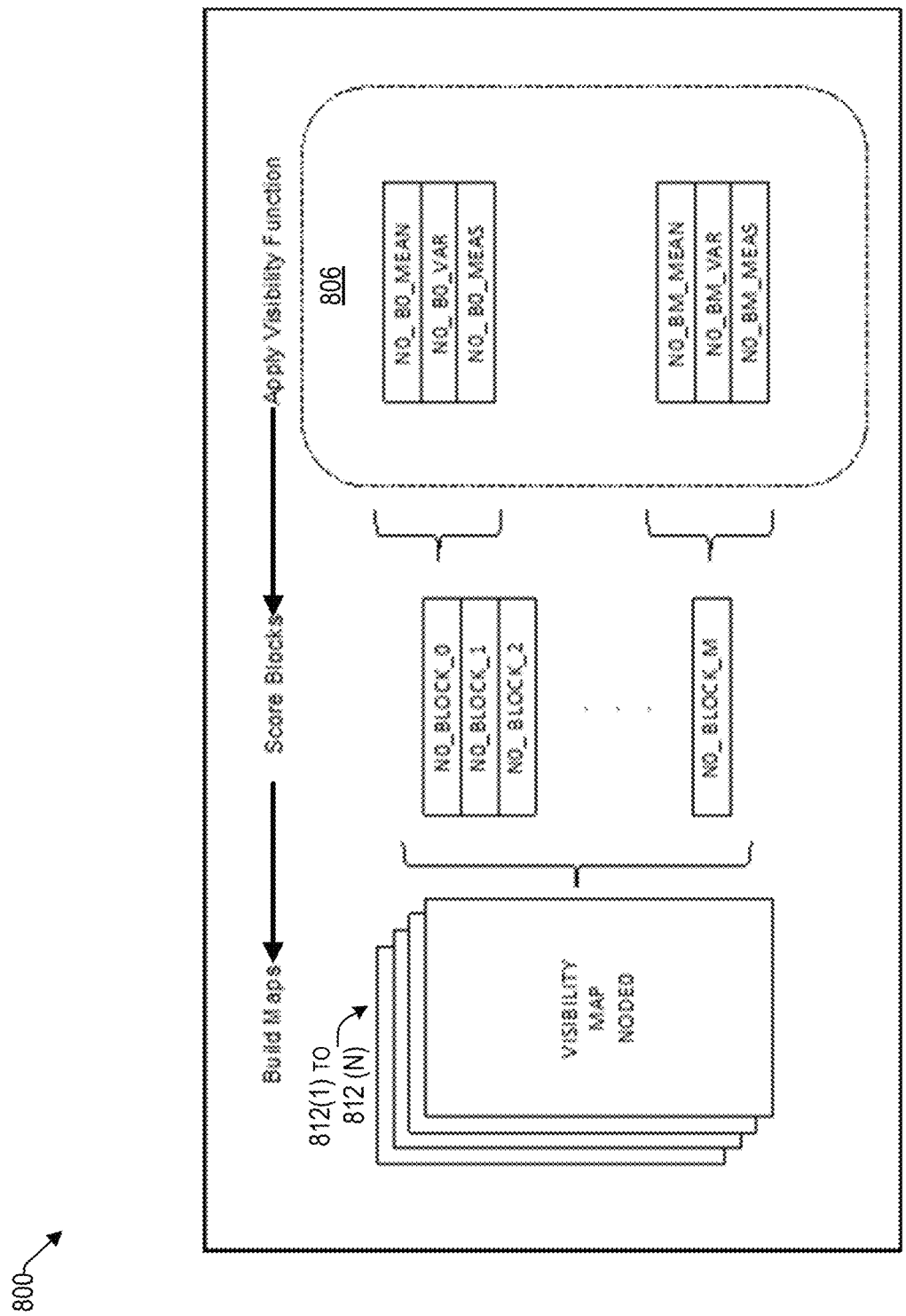
FIG. 8 is a block diagram of data structures used to generate a visibility/occlusion map for each node for an area, consistent with an illustrative embodiment.

FIG. 8 is a block diagram 800 of data structures used to generate a visibility/occlusion map for each node for an area, consistent with an illustrative embodiment. Block 806 indicates statistics computed by the IPS deployment engine for a particular node across each block of an area. The specified visibility function is applied to the statistics for each block and scores (e.g., based on the RSSI or distance measure) calculated are annotated into the corresponding block of the visibility map. For each node a corresponding visibility map is created (e.g., 812(1) to 812(N)).

For example, for each BLE node, an average drop rate is calculated by the IPS deployment engine across each block of the grid map (e.g., for each block defined in the map). A visibility map is generated visualizing this metric for the grid map. A BLE node's coverage can be quantified as the sum of the average drop rates across all states. Nodes with the worst scores are prioritized for removal.

Accordingly, as explained above, both precision and visibility maps can be used by the IPS deployment engine to facilitate the determination of the number of BLE nodes and the locations thereof. In one embodiment, the administrator iteratively adds/removes BLE nodes in the area to optimize system performance based on the generated maps and several metrics, as discussed herein. Table 1 below provides some simple metrics that can be used in the context of the generation of precision maps, by way of example only and not by way of limitation:

TABLE 1

1. Average minimum variance: The average variance of the n nodes with the minimum variance
2. Maximum minimum variance: The maximum variance of the n nodes with the minimum variance
3. Average minimum average error: The average distance error (based on difference from UWB positioning to BLE node distance) of the n nodes with the minimum average error
4. Maximum minimum average error: The maximum distance error (based on difference from UWB positioning to BLE node distance) of the n nodes with the minimum average error Table 2 below provides some simple metrics that can be used in the context of the generation of visibility maps, by way of example only and not by way of limitation:

TABLE 2

1. Drop rate: rate that node measurements are received within a given block. (Number measurements received/Total samples taken)
2. Error threshold average: Average rate of measurements within distance error threshold (based on UWB positioning)

Regarding the drop rate, by way of example, if at a grid block 10 measurements are performed and 10 measurements are received from a node, then a node is active in that its data can be read well since the number of measurements received are equal to the total number of samples taken. However, if at a grid block 10 measurements are taken and only 5 measurements are received from the node due to, for example, an obstructing object, then the drop rate would be 50%. While some example metrics are provided in tables 1 and 2 above, it will be understood that other appropriate metrics can be used as well.

In one embodiment, black-out maps are generated by the IPS deployment engine from the accumulation of visibility metrics across nodes. Black-out maps are derived from visibility maps and are therefore collectively referred to herein as visibility maps. The black-out maps across the state grid represent the combined visibility of all nodes (e.g., it visualizes states that do not receive signal propagation from any nodes.) Stated differently, a plurality of visibility maps are used to create a blackout map. Black-out maps visualize states (e.g., positions) that do not receive signal propagation from any nodes. In one example, the visibility maps are summed across all nodes. Any grid position with a sum less than a predetermined threshold is deemed a black-out region by the IPS deployment engine. Such designation may communicate to the administrator that the region does not have service from available BLE nodes and positioning algorithms will not be able to operate sufficiently, and one or more nodes need to be added or moved to this area.

In one embodiment, the administrator also is able to introduce new constraints in the form of metrics to the data. Once the administrator has reached adequate performance, UWB can be disabled and the low energy, high performance BLE configuration can be used long-term during the active phase. The UWB system can be reactivated periodically to perform maintenance on the system or to adjust for environmental changes.

If UWB nodes are no longer available for re-deployments, some measurements from the BLE nodes can still be used to determine if the long-term BLE configuration is still effective. For example, the metrics in Table I, average minimum variance or maximum minimum variance, or other metric that does not require UWB positioning, can be used to determine low precision/high uncertainty regions in the case of precision/uncertainty maps. The same could be used for visibility/occlusion maps to determine if a BLE node is no longer visible across the grid map.

The pseudocode below provides an example of an update that can be performed.

```
Input: Map, algorithm, nodes, visibility function, precision function, UWB configuration,
agent configurations (receivers)
Output: Visibility map, precision map, black-out map, performance metrics
Generate initial deployment
While true do:
    Collect BLE nodes data with UWB position
    Update precision and visibility maps
    If designer update signals received then
        Get designer constraint updates on mobile app
        Display precision, visibility, and blackout maps to mobile app
        Provide node placement recommendations to mobile app
        Designer-in-the-loop update sent to IPS deployment app from mobile app
        Update IPS deployment app
```

Example Process

Figure 9:
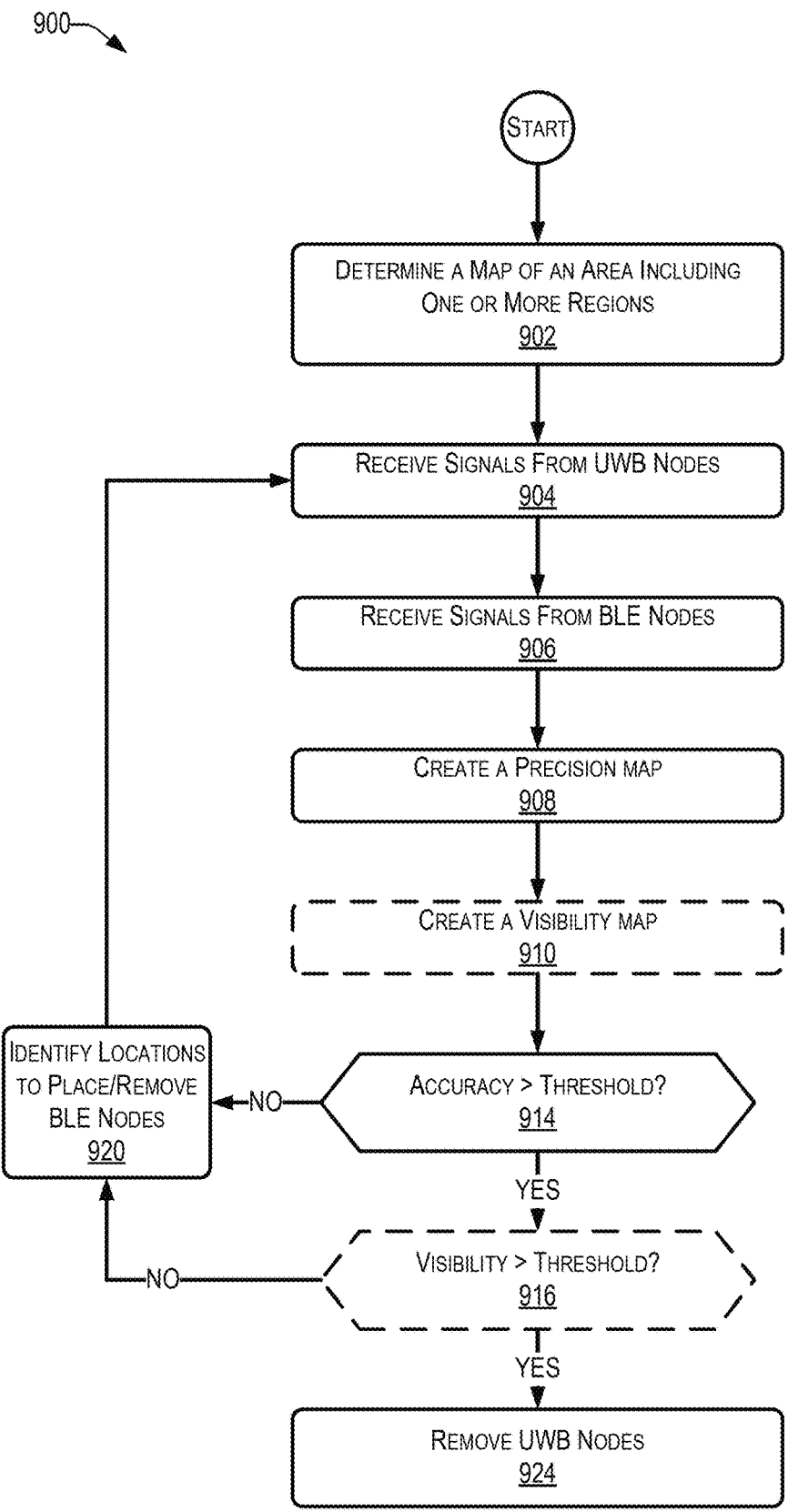
FIG. 9 presents an illustrative process for the deployment of an indoor positioning system during a setup phase.

With the foregoing overview of the architecture 100, example mobile device 300 of FIG. 3, and example block diagram 400, it may be helpful now to consider a high-level discussion of an example call flow process. To that end, FIG. 9 presents an illustrative process 900 for the deployment of an IPS during a setup phase. Process 900 is illustrated as a collection of blocks in a process, representing a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or performed in parallel to implement the process. For discussion purposes, the process 900 is described with reference to the architecture 100 of FIG. 1. More particularly, it will be assumed that the IPS deployment engine 132 is hosted by an IPS deployment engine server 120, while it will be understood that in other embodiments, the IPS deployment engine may be part of an agent (e.g., 112 or 114).

At block 902, a map of an area 102 including one or more regions is determined. For example, the map may be received from a computing device 130 of an administrator 131 over the network 106. In some embodiments, various constraints may be received from the computing device 130 of the administrator 131. For example, these constraints may include, walls, equipment that cannot be readily moved, areas to avoid sensor placement, etc. Different regions of the area 102 may have different constraints. In some embodiments, precision thresholds may be provided to the IPS deployment engine 132 by the administrator 131, which may be different for each region of the area.

At block 904, in various embodiments, one or more agents may be moved around in the area to different positions, or may even be stationary. At block 906, for each of the positions, signals from a plurality of UWB nodes are received by the corresponding agent. Similarly, signals from a plurality of BLE nodes are received by the corresponding agent. These signals are relayed through these one or more agents to the computing device 120 of the IPS deployment engine 132 of FIG. 1.

At block 908, a precision map is created based on a correlation between the captured signals from the UWB nodes and the captured signals from the BLE nodes.

At block 910, in one embodiment, visibility maps are created based on the captured signals from the BLE nodes. For example, a visibility map for each BLE node is created to highlight the visibility of the corresponding node.

At block 920, locations to place the plurality of BLE nodes are identified. In various embodiments, the determination of the placement may be based on the precision map, the visibility maps, or a combination thereof, as discussed herein.

For example, regarding the precision map, for each of the positions, a first estimate of a location of the position of the corresponding agent is calculated based on the captured signals from at least some of the UWB nodes. A second estimate of the location of the position is calculated based on the captured signals from at least some the BLE nodes. The first and second estimates of the location may be by way of trilateration of the captured signals from the UWB nodes and BLE nodes, respectively. The first estimate is used as a ground truth reference in a comparison with the second estimate. A difference between the first estimate and the second estimate is determined. Stated differently, the more variance the signals from the BLE nodes have with respect to the ground truth, the less precise or uncertain that location is deemed to be, which is captured in the precision map. In various embodiments, the precision may be characterized in different ways. For example, the precision may be based on variation between the location provided by the UWB nodes and those by the BLE nodes. The second type of variation may be variation over time. For example, the same measurements may be taken at different times from the BLE nodes. If the signal from the BLE nodes varies over time above a predetermined threshold, then it is deemed as a high uncertainty and/or low precision region.

At block 914 a determination is made whether the accuracy for each location is above a predetermined threshold. If not (i.e., "NO" at decision block 914), the process continues with block 920, where the BLE nodes are placed at the appropriate locations, as provided by the precision map and/or the visibility maps discussed above. The iterative process then returns to block 904. However, upon determining that the accuracy for each location is above the predetermined threshold (i.e., "YES" at decision block 914), then, in one embodiment (at block 916), for each BLE node, the IPS deployment engine 132 in FIG. 1 determines whether the visibility of the corresponding BLE node is above a predetermined threshold. If the visibility is not above the predetermined threshold (i.e., "NO" at decision block 916), then the process continues with block 920, where the corresponding BLE node is removed/relocated. However, upon determining that the visibility is above the predetermined threshold (i.e., "YES" at decision block 916, it is indicative that the deployment of the IPS has been optimized. In this regard, in one embodiment, at block 924 the UWB nodes can be removed and repurposed for another area.

Upon completion of the setup phase, the positioned BLE nodes can provide accurate and low-cost positioning guidance to user devices that are compatible with the BLE technology.

Example Computer Platform

Figure 10:
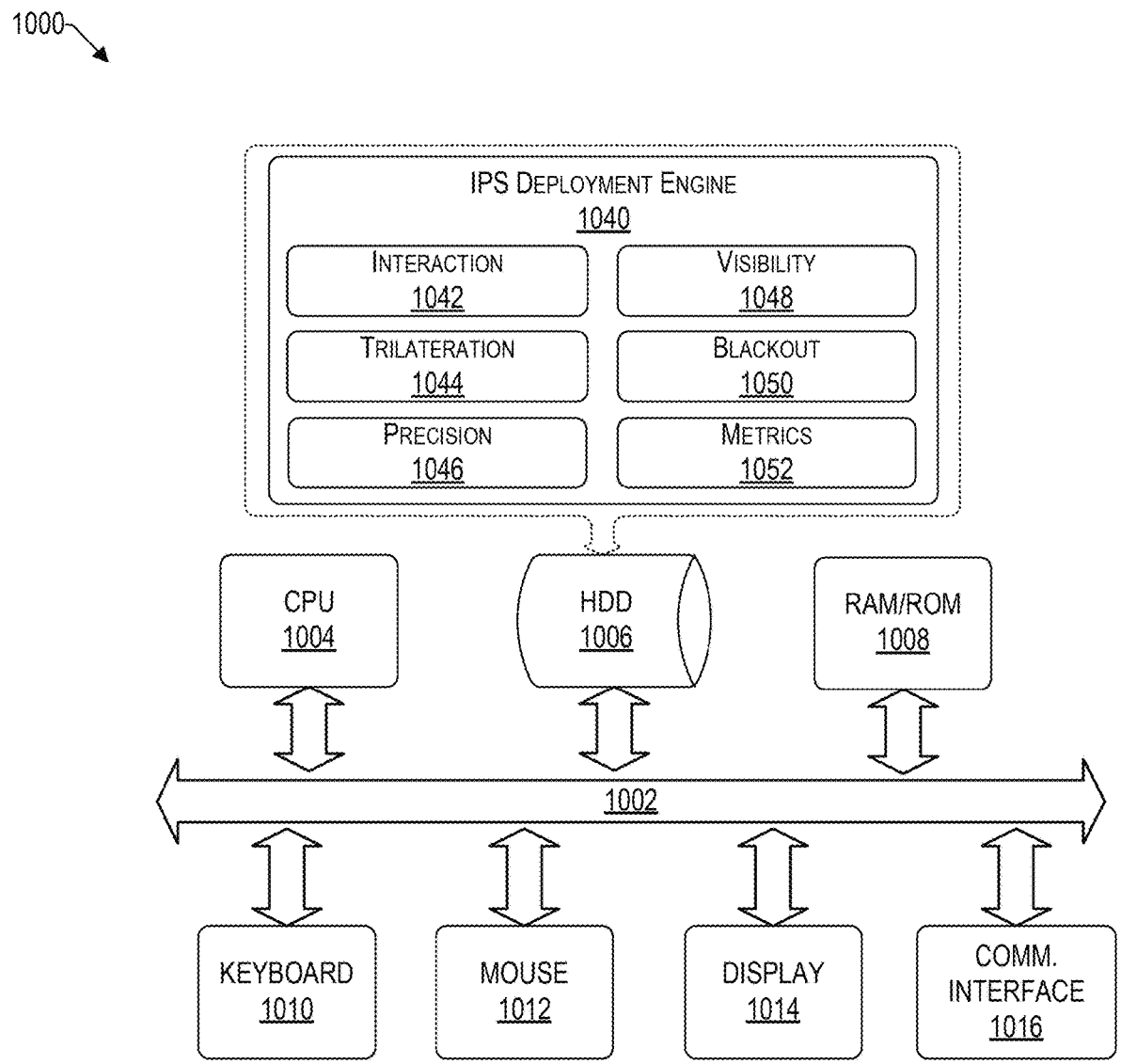
FIG. 10 is a functional block diagram illustration of a computer hardware platform such as a deployment engine server of FIG. 1.

As discussed above, functions relating to optimizing the deployment of an IPS can be performed with the use of one or more computing devices connected for data communication via wireless communication, as shown in FIG. 1. An example mobile device 300 in the form of a smart phone device was discussed in the context of FIG. 3. FIG. 10 is a functional block diagram illustration of a computer hardware platform, such as a deployment engine server 120 in FIG. 1, that can communicate with various networked components, as discussed herein.

The computer platform 1000 may include a central processing unit (CPU) 1004, a hard disk drive (HDD) 1006, random access memory (RAM) and/or read only memory (ROM) 1008, a keyboard 1010, a mouse 1012, a display 1014, and a communication interface 1016, which are connected to a system bus 1002.

In one embodiment, the HDD 1006, has capabilities that include storing a program that can execute various processes, such as the IPS deployment engine 1040, in a manner described herein. The IPS deployment engine 1040 may have various modules configured to perform different functions. For example, there may an interaction module 1042 operative to receive data regarding UWB and BLE signals from various agents over a network. There may be a trilateration module 1044 operative to calculate a location of an agent based on the signals received from the UWB and/or BLE signals. There may be a precision module 1046 operative to generate a precision map for an area. There may be a visibility map module 1048 operative to generate a visibility map for each BLE node in an area. There may be a black-out map module 1050 operative to highlight locations in an area where positioning is not effective. There may be a metrics module 1052 operative to harvest various signal metrics, as discussed herein.

While the modules of the IPS deployment engine 1040 are described above in the context of the HDD 1006, it is noted that one or more functions of these modules can be performed in hardware.

In one embodiment, a program, such as Apache™, can be stored for operating the system as a Web server. In one embodiment, the HDD 1006 can store an executing application that includes one or more library software modules, such as those for the Java™ Runtime Environment program for realizing a JVM (Java™ virtual machine).

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
a processor;
a network interface coupled to the processor to enable communication over a network;
a storage device for content and programming coupled to the processor;
an indoor positioning system (IPS) deployment engine stored in the storage device, wherein an execution of the IPS deployment engine by the processor configures the computing device to perform acts comprising, during a setup phase:
  determining a map of an area including one or more regions;
  receiving signals from a plurality of ultra-wideband (UWB) nodes and a plurality of Bluetooth Low energy (BLE) nodes in the area, relayed through one or more agents at one or more positions of the area;
  for each BLE node: creating a visibility map based on the received signals from the plurality of BLE nodes in the area;
  creating a precision map based on a correlation between the received signals from the UWB nodes and the received signals from the BLE nodes; and
  identifying locations to place the plurality of BLE nodes based on the precision map and the visibility map.

2. The computing device of claim 1, wherein execution of the IPS deployment engine by the processor further configures the computing device to upon completing the setup phase, instructing to remove the UWB nodes upon the plurality of BLE nodes being placed based on the precision map.

3. The computing device of claim 1, wherein execution of the IPS deployment engine by the processor further configures the computing device to iteratively repeat the acts of the setup phase until each of the one or more nodes is placed in a location that meets one or more predetermined criteria.

4. The computing device of claim 1, wherein the act of determining the map of the area comprises receiving the map from a computing device of an administrator.

5. The computing device of claim 1, wherein execution of the IPS deployment engine by the processor further configures the computing device to perform acts comprising: receiving constraints of the area from a computing device of an administrator.

6. The computing device of claim 5, wherein the constraints comprise, for each region of the area, at least one of: walls, equipment, one or more locations to avoid a BLE sensor placement, or a BLE sensor precision threshold.

7. The computing device of claim 6, wherein not all of the one or more regions have the same constraints.

8. The computing device of claim 1, wherein receiving signals from the UWB nodes and the plurality of BLE nodes in the area comprises: moving at least one of the one or more agents in the area to each of the one or more positions of the area.

9. The computing device of claim 1, wherein each BLE node having a visibility that is below a predetermined threshold is identified for removal.

10. The computing device of claim 1, wherein creating the precision map comprises, for each of the one or more positions in the area:
  calculating a first estimate of a location of the position of the corresponding agent based on the received signals from the plurality of UWB nodes in the area;
  calculating a second estimate of the location of the position of the corresponding agent based on the received signals from at least some the plurality of BLE nodes in the area;
  using the first estimate as a ground truth reference for the second estimate;
  determining a difference between the first estimate and the second estimate; and
  recording the determined difference in the precision map.

11. The computing device of claim 10, wherein a precision captured in the precision map is based on at least one of:
  a variance between the first estimate and the second estimate at a predetermined time; or
  a variance between the first estimate and the second estimate over a time period.

12. The computing device of claim 10, wherein the first and second estimates of the location are by way of trilateration of the received UWB and BLE signals, respectively.

13. A non-transitory computer readable storage medium tangibly embodying a computer readable program code having computer readable instructions that, when executed, causes a computing device to carry out a method of deploying an indoor positioning system (IPS), the method comprising, during a setup phase:
  determining a map of an area including one or more regions;
  receiving signals from a plurality of ultra-wideband (UWB) nodes and a plurality of Bluetooth Low energy (BLE) nodes in the area, relayed through one or more agents at one or more positions of the area;
  for each BLE node: creating a visibility map based on the received signals from the plurality of BLE nodes in the area;
  creating a precision map based on a correlation between the received signals from the UWB nodes and the received signals from the BLE nodes; and
  identifying locations to place the plurality of BLE nodes based on the precision map and the visibility map.

14. The non-transitory computer readable storage medium of claim 13, wherein creating the precision map comprises, for each of the one or more positions in the area:
  calculating a first estimate of a location of the position of the corresponding agent based on the received signals from the plurality of UWB nodes in the area;
  calculating a second estimate of the location of the position of the corresponding agent based on the received signals from at least some the plurality of BLE nodes in the area;
  using the first estimate as a ground truth reference for the second estimate;
  determining a difference between the first estimate and the second estimate;
  recording the determined difference in the precision map.

15. The non-transitory computer readable storage medium of claim 13, further comprising: upon completing the setup phase, instructing to remove the UWB nodes upon placing the plurality of BLE nodes based on the precision map.

16. The non-transitory computer readable storage medium of claim 13, further comprising: iteratively repeating the acts of the setup phase until each of the one or more nodes is placed in a location that meets one or more predetermined criteria.

17. The non-transitory computer readable storage medium of claim 13, further comprising, receiving from a computing device of an administrator, constraints of the area, comprising, for each region of the area at least one of: walls, equipment, one or more locations to avoid a BLE sensor placement, or a BLE sensor precision threshold.

18. The non-transitory computer readable storage medium of claim 13, wherein each BLE node having a visibility that is below a predetermined threshold is identified for removal.

19. A method of deploying an indoor positioning system (IPS), comprising:
 during a setup phase:
  determining a map of an area including one or more regions;
  receiving signals from a plurality of ultra-wideband (UWB) nodes and a plurality of Bluetooth Low energy (BLE) nodes in the area, relayed through one or more agents at one or more positions of the area;
  creating a precision map based on a correlation between the received signals from the UWB nodes and the received signals from the BLE nodes;
  for each BLE node: creating a visibility map based on the received signals from the plurality of BLE nodes in the area; and
  identifying locations to place the plurality of BLE nodes based on the precision map; and
 upon completing the setup phase, removing the UWB nodes upon placing the plurality of BLE nodes based on the precision map and the visibility map.

20. The method of claim 19, further comprising: iteratively repeating the acts of the setup phase until each of the one or more nodes is placed in a location that meets one or more predetermined criteria.

21. The method of claim 19, further comprising: removing each BLE node having a visibility that is below a predetermined threshold.

22. A method of deploying an indoor positioning system (IPS), comprising:
 during a setup phase:
  determining a map of an area including one or more regions;
  receiving signals from a plurality of ultra-wideband (UWB) nodes and a plurality of Bluetooth Low energy (BLE) nodes in the area, relayed through one or more agents at one or more positions of the area;
  creating a precision map based on a correlation between the received signals from the UWB nodes and the received signals from the BLE nodes; and
  identifying locations to place the plurality of BLE nodes based on the precision map; and
 upon completing the setup phase, removing the UWB nodes upon placing the plurality of BLE nodes based on the precision map,
 wherein creating the precision map comprises, for each of the one or more positions in the area;
 calculating a first estimate of a location of the position of the corresponding agent based on the received signals from the plurality of UWB nodes in the area;
 calculating a second estimate of the location of the position of the corresponding agent based on the received signals from at least some the plurality of BLE nodes in the area;
 using the first estimate as a ground truth reference for the second estimate;
 determining a difference between the first estimate and the second estimate;
 recording the determined difference in the precision map.

* * * * *